United States Patent [19]

Takao et al.

[11] Patent Number: 4,818,075

[45] Date of Patent: Apr. 4, 1989

[54] COLOR LIQUID CRYSTAL DEVICE

[75] Inventors: Hideaki Takao, Sagamihara; Miki Tamura, Yokohama; Masaru Kamio, Atsugi; Tatsuo Murata, Ohme; Nobuyuki Sekimura, Kawasaki, all of Japan

[73] Assignee: Canon Kabushiki Kaisha, Tokyo, Japan

[21] Appl. No.: 140,093

[22] Filed: Dec. 31, 1987

[30] Foreign Application Priority Data

Jan. 23, 1987 [JP] Japan .................................. 62-14924

[51] Int. Cl.$^4$ ................................................. G02F 1/13
[52] U.S. Cl. .............................. 350/339 F; 350/339 R
[58] Field of Search .............................. 350/339 F, 311

[56] References Cited

U.S. PATENT DOCUMENTS

| 4,593,977 | 6/1986 | Takamatsu et al. | 350/339 F |
| 4,639,088 | 1/1987 | Suginoya et al. | 350/339 F |
| 4,704,559 | 11/1987 | Suginoya et al. | 350/339 F |
| 4,712,874 | 12/1987 | Sekimura et al. | 350/339 F |
| 4,714,636 | 12/1987 | Tokono et al. | 350/339 F |
| 4,744,637 | 5/1988 | Sekimura et al. | 350/339 F |

FOREIGN PATENT DOCUMENTS 0082445 7/1978 Japan .............................. 350/339 F Primary Examiner—Stanley D. Miller
Assistant Examiner—Anita E. Pellman
Attorney, Agent, or Firm—Fitzpatrick, Cella, Harper & Scinto

[57] ABSTRACT

Disclosed is a color liquid crystal device comprising a pair of substrates having electrodes, a color filter disposed between at least one of the pair of substrates and the electrodes or on the electrodes, and a liquid crystal disposed between the pair of substrates. The color filter is composed of a resin and a coloring material, and V and P have a relationship of $\tfrac{1}{3} \leq P/V \leq 3/2$, where V (gr) and P (gr) are the respective contents of the resin and the coloring material that forms the color filter.

34 Claims, 4 Drawing Sheets

PATTERNED PRECOLORED
RESIN FILMS
9  9a  9b

4 PROTECTIVE
LAYER

COLOR LIQUID CRYSTAL DEVICE

BACKGROUND OF THE INVENTION

1. Field of the Invention

The present invention relates to a color liquid crystal device which provides a display by utilizing an electrooptic change generated between a pair of substrates having a plurality of electrodes constituting display element units, and, more particularly, to a color liquid crystal device which provides a display by utilizing an electrooptic change generated between a pair of substrates having a plurality of electrodes constituting display element units, and which has a color filter in its substrate. More specifically, the present invention concerns a color liquid crystal device which uses a color filter formed with a photosensitive precolored resin containing a coloring material at a regulated rate so as to eliminate defects in the orientation of liquid crystal molecules and provide a display of good quality.

2. Description of the Prior Art

Liquid crystal devices of the above-described type fall into two categories: a time division driven type of liquid crystal device (commonly known as a single matrix type) that consists of a pair of substrates having striped transparent electrodes formed perpendicular to those in another substrate and a twisted nematic type or ferroelectric liquid crystal material which is hermetically sealed between the substrates as an electrooptic modulation material, and an active matrix driven type of liquid crystal device (commonly known as an active matrix type) which have switching elements such as thin film transistors (commonly known as TFTs) for each display picture element.

In order to provide a color display, such liquid crystal devices must incorporate a transmission type color filter of red, green and blue on the surface thereof. In most cases, such color filters are disposed within the liquid crystal device in order to minimize the degree of parallax generated when the color display devices are viewed from the side.

Color filter incorporating liquid crystal devices of this type are in general formed by either of the following two methods:

In the first method, a color filter pattern 3 is formed on a substrate 1 on which a transparent electrode pattern 2 has been formed in such a manner as to be in alignment with the transparent electrode pattern 2, as shown in FIG. 4(a). If necessary, a protective layer 4 is formed over the entire surface, and an orientation film 5 is then formed on the protective layer 4. After a rubbing treatment has been conducted on the orientation film 5, the thus-formed first substrate is pasted with a second substrate, and a liquid crystal fluid is charged into the gap between the substrates so as to form a color liquid crystal device.

In the second method, the color filter pattern 3 is first formed on the substrate, as shown in FIG. 4(b), and the protective layer 4 is then formed over the entire surface, if necessary. After a transparent electrode layer made of a material such as Indium-Tin-Oxide is coated by sputtering or deposition and a photoresist pattern is applied to the transparent electrode layer 2, the transparent electrode layer 2 is selectively etched to form a transparent electrode pattern 2 in alignment with the color filter pattern. Subsequently, the photoresist pattern is removed, and the orientation film 5 is formed over the entire surface. After a rubbing treatment has been conducted to the orientation film 5, the thus-formed first substrate is pasted with a second substrate, and a liquid crystal fluid is charged into the gap between the substrates so as to form a color liquid crystal device.

In color filter incorporating liquid crystal devices of the above-described type, the performance of the liquid crystal device is greatly affected by the surface or side shapes of the color filter pattern and/or the properties of the color filter.

Conventionally, it has been known for a color filter to be formed with a precolored resin composed of a photosensitive resin containing a coloring material. Use of the photosensitive resin is advantageous because it can be formed into a fine pattern solely by use of the photolithographic process. The photosensitive resin is mixed with a coloring material beforehand to prepare a precolored resin, and the ratio at which they are mixed may induce problems involving the hardening of the resin and affecting the characteristics of the formed resin film.

For example, the mixture ratio may be a cause of problems relating to the patterning accuracy, such as peel-off of the resin owing to hardening failure and rough pattern edges or pattern surfaces, as well as cracks or breakage of the resin film that may occur in a subsequent process. The presence of any of these defects in the color filter may lead to a deflection in the orientation of the liquid crystal material, resulting in a color liquid crystal device which provides a poor display.

SUMMARY OF THE INVENTION

In view of the above-described problems of the prior art, an object of the present invention is to provide a color liquid crystal device having a color filter formed with a photosensitive precolored resin that is convenient to process by the photolithographic process and which enables the surface and side shapes of a thin color filter pattern to be kept in a good condition so as to form a non-defective color filter pattern of a good quality and provide a color liquid crystal device that has no defects in the orientation of a ferroelectric liquid crystal and thereby enures an excellent display by restricting the ratio of a coloring material to a resin such as a photosensitive resin that is employed to disperse the coloring material.

The present invention provides a color liquid crystal device comprising a pair of substrates having electrodes, a color filter disposed between at least one of the pair of substrates and the electrodes or on the electrodes, and a liquid crystal material disposed between the pair of substrates, wherein the color filter is composed of a resin and a coloring material, and V and P have a relationship of $\frac{1}{3} \leq P/V \leq 3/2$, where V (gr) and P (gr) represent the respective contents of the resin and the coloring material that forms the color filter.

To achieve the above-described object, the present inventors have taken notice of the proportion of the coloring material to the resin in weight terms, the coloring material and the resin being the constitutents of a precolored resin used to form the color filter, and have discovered through experiments a color liquid-crystal device having a color film that is capable of eliminating deflection in the orientation of a ferroelectric liquid crystal.

DESCRIPTION OF THE PREFERRED EMBODIMENTS

Figure 1:
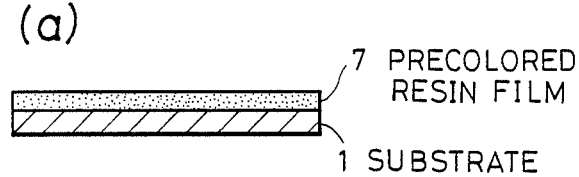
FIGS. 1(a) to (f) illustrate processes for forming a color filter substrate according to the present invention.
Figure 1:
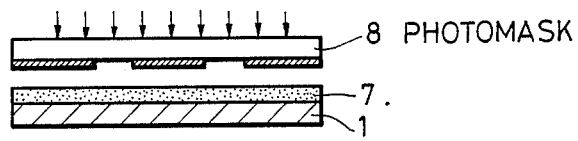
Figure 1:
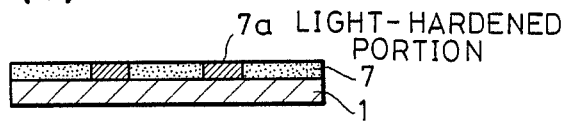
Figure 1:
Figure 1:
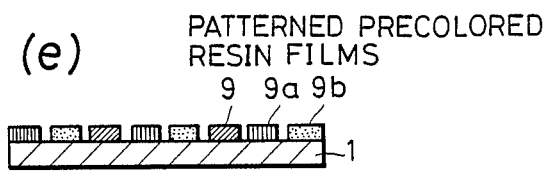
Figure 1:
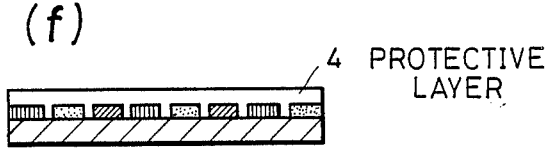

Embodiments of the present invention will be hereinunder described by way of example.

Any conventional resist material may be employed as the photosensitive resin used to form a color filter of the present invention. In particular, any of such resist materials that exhibit excellent properties in regard to mechanical characteristics, heat-resistance, light-resistance and solvent-resistance when used to form a color liquid crystal device may suitably be used.

Such suitable resist materials include those that can be hardened to form a hard film at a temperature equal to or lower than 200° C., such as aromatic series polyamide resins and polyimide resins having photosensitive groups in their molecules that can be hardened to form a hard film by the application of heat of 150° for 30 minutes, and that do not absorb light having a wavelength ranging between 400 and 700 nm and corresponding to a visible spectrum of light (that is, having a light transmittance of about 90% or above). From this point of view, polyamide resins are particularly preferable.

Suitable aromatic chains include those that have any of the following photosensitive unsaturated hydrocarbon groups as the photosensitive groups of the present invention:

(1) Benzoic esters

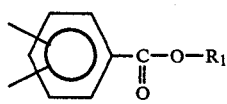

(where $R_1$ represents $CHX=CY-COO-Z-$, in which X denotes $-H$ or $-C_6H_5$, Y denotes $-H$ or $-CH_3$, Z denotes —, ethyl group or a glycidyl group.)

(2) Benzyl acrylates

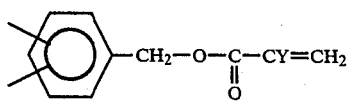

(where Y represents $-H$ or $CH_3$.)

(3) Dephenyl ethers

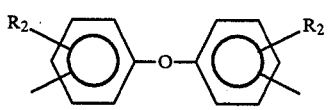

(where $R_2$ represents at least one $CHX=CY-CONH-$, $CH_2=CY-COO-(CH_2)_2-OCO-$ or $CH_2=CY-COO-Ch_2-$, in which X and Y denote the above-mentioned groups, respectively.)

(4) Chalcones and other compounds

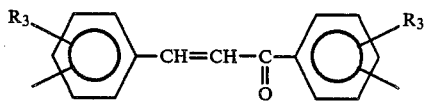

(where $R_3$ represents $H-$, an algyl group or an alkoxy group.)

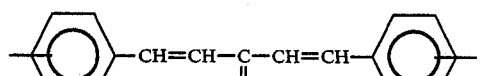

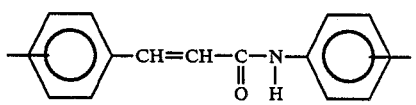

Concretely, the aromatic series polyamide resins or polyimide resins that have any of the above groups in molecules may be Lithocoat PA-100 (product of Ube Industries, Ltd.) or Lithocoat PI-400 (also product of Ube Industries, Ltd.).

Generally, not many photosensitive resins that can be employed in the photolithographic process have excellent mechanical characteristics and exhibit excellent properties in terms of heat-resistance, light-resistance and solvent-resistance, although their characteristics differ depending on their chemical structures. On the other hand, the photosensitive polyamino type resins such as polyamide resins and polyimide resins have excellent mechanical and other characteristics due to their chemical structure, and ensure that a color filter formed of any of these resins will have good durability.

Any organic or inorganic pigment or dye that provides desired spectral characteristics may be employed as a coloring material for forming a color filter of the present invention. It may be used as it is, or it may be mixed with another pigment or dye to form a coloring material. If a dye is used as a coloring material, the performance of a resultant color filter will be determined by the durability of the dye employed. However, use of a dye with any of the above-described resins ensures that the resultant color filter has an even better performance than could be expected with a known color filter employing a dye. Therefore, from the viewpoint of the color and other characteristics of a resultant color filter, it is most preferable for an organic pigment to be used as the coloring material.

Suitable organic pigments include azo-pigments such as soluble, non-soluble or condensed azo pigments, phthalocyanine pigments, condensed polycyclic pigments such as indigo, anthraquinone, perylene, perinon, dioxazine, quinacridone, isoindolenone, phthalon, methine azomethine or other metal complex pigments, and mixtures of any of these pigments.

To prepare a precolored resin that may be used to form a color filter of the present invention, any of the above-described coloring materials having desired spectral characteristics is mixed in a solution of any of the above-described photosensitive polyamino resins in a P/V ratio ranging between $\frac{1}{3} \leq P/V \leq 3/2$, where V (gr) and P (gr) are respectively the amount of photosensitive resin and the amount of coloring material. After the coloring material has been sufficiently dispersed in the solution using ultrasonic waves, a triple roll mill, a ball mill or a sand mill, the dispersion is filtered using a filter of about 1 μm to remove large particles.

The P/V ratio that is specified as $\frac{1}{3} \leq P/V \leq 3/2$ in the present invention will now be described concretely. When the type and the amount of the coloring material are decided with a view to obtaining desired spectral characteristics, the amount V of the photosensitive resin is set in a certain range with a view to achieving the formation of a particular color filter and/or elimination of generation of deflection in the orientation of the liquid crystal.

More specifically, if P/V > 3/2, the following problems will occur owing to the excessive amount of coloring material contained in the precolored resin:

(1) Preparation of a uniformly dispersed precolored resin becomes difficult. This may increase the degree of variation in the color of a resultant color filter and the roughness of the surface of the color filter, which can be a cause of deflection in the orientation of the liquid crystal being generated.

(2) Light absorption by the coloring material during the hardening process may increase, causing hardening failure of the photosensitive resin itself. This in turn causes cracks, breakage or peel-off of the photosensitive resin during the developing process, which may lead to deflection in the orientation of the liquid crystal.

(3) Scattering by the coloring material during hardening process may increase. This, together with the scarceness of a binder, may cause the edges of the color filter pattern to be notched, and deflection in the orientation of the liquid crystal may in turn be caused.

(4) The film of the formed color filter may become brittle, and cracks or breakage thereof caused by a spacer or the like may occur during formation of a liquid crystal device, again generating the deflection in the orientation of the crystal liquid. As a result, formation of a color liquid crystal device that provides a display of good quality becomes difficult.

Conversely, if P/V < $\frac{1}{3}$, the following problems may occur due to the excessive amount of resin contained in the precolored resin:

(1) The thickness of the color filter layer may become large, increasing the difference in levels on the surface of a substrate and thereby causing deflection in the orientation of the liquid crystal.

(2) The resultant increase in the thickness of the color filter layer may inhibit the formation of a precise pattern of the photosensitive resin. This may cause deflection in the orientation of the liquid crystal.

(3) The resultant increase in the thickness of the color filter layer accordingly increases the reduction in the height of the color filter layer by the spacer when the color filter is formed into a liquid crystal device. This makes it difficult to provide a uniform cell gap, and causes cracks or breakage of the color filter at the portion thereof at which reduction in its height takes place, which may lead to deflection in the orientation of the liquid crystal.

As a result, provision of a color liquid crystal that provides a display of good quality also becomes difficult here, as in the case wherein P/V > 3/2.

Any of the above-described problems may cause the disorder of the orientation film on the surface thereof at which it makes contact with the liquid crystal and, in turn, deflection in the orientation of the molecules, even when a protective film, transparent electrodes or an orientation film is coated over the color filter film.

Therefore, to form a color liquid crystal device that provides a display of good quality, it is necessary to form a color filter with a photosensitive precolored resin whose P/V ratio is restricted within $\frac{1}{3} \leq P/V \leq 3/2$ so as to prevent deflection in the orientation of the liquid crystal.

If the P/V ratio is set within the above-described range, it is possible to form a color filter which is good enough in terms of basic color characteristics, film thickness, and performance in addition to assuring the proper orientation of the liquid crystal.

In order to form a color filter of the present invention, the thus-prepared precolored resin is coated on a substrate by a means of a coating device such as a spinner or a roll coater, and the coated resin film is then formed by the photolithographic process into a desired pattern having a thickness that is determined by the desired spectral characteristics, e.g., between 0.5 and 5 μm, and more preferably, between 1 and 2 μm.

Although the color filter of the present invention is made of a material that has sufficient durability, a protective layer may be formed over it to protect it from various environmental conditions. Such a protective layer may be a layer of an organic resin such as a polyamide, polyimide, polyurethane, a polycarbonate or a silicone or an inorganic substance such as $Si_3N_4$, $SiO_2$, SiO, $Al_2O_3$ or $Ta_2O_3$, which is coated by spin coating or roll coating or deposited on the surface of the color film layer. The protective film may be formed between the color filter layer and the electrode pattern if the color filter layer is disposed between the electrode pattern and the substrate. Alternatively, it may be formed on the color filter layer if the color filter layer is formed on the electrode pattern. If an orientation treatment is conducted after the formation of the protective layer, the resultant color filter substrate may be formed into a device that employs a liquid crystal material.

The thickness of the protective layer is set within a range between 0.2 and 10 μm, and more preferably, between 0.5 and 5 μm.

If it is necessary for the adherence between the color filter layer and the substrate to be increased in strength, a silane coupling agent may be thinly coated over the substrate before the formation of the color filter pattern, or a precolored resin that contains a small amount of silane coupling agent may be used to form a color filter layer.

For the purpose of improving the display characteristics and filling in the gaps between picture elements, a light-shielding layer may be formed in alignment with the gaps between the picture elements. It may be a thin film of a metal that is capable of shielding light such as chrome or aluminum or a layer of a light-shielding resin that is composed of a photosensitive polyamino type resin with a material that is capable of shielding light such as a compound oxide black pigment or metal powder dispersed therein. The metal film is formed by deposition, and the resin layer is formed by coating.

Materials that may be used to form an orientation film of the type employed in the present invention include resins such as polyvinyl alcohols, polyimides, polyamide-imides, polyesters, polycarbonates, polyvinyl acetals, a polyvinyl chloride, a polyvinyl acetate, polyamides, polystyrenes, cellulosic resins, melamine resins, urea resins and acrylic resins, photosensitive polyimides, photosensensitive polyamides, cyclized rubber type photoresists, phenolic novolac type photoresists, and electron beam photoresists [methacrylate (a moloner or a olygomer), epoxidized-1,4-polybutadiene].

In addition to any TN type liquid crystal material, a liquid crystal that exhibits bistability and ferroelectricity may be employed in the present invention. Concretely, it may be a chiral smectic C (SmC*), H (SmH*), I (SmI*), J (SmJ*), K (SmK*), G (SmG*) or F (SmF*) liquid crystal.

Any of the ferroelectric liquid crystals that are described in Ferroelectric Liquid crystals in issue No. 36 (L-69) of "LE JOURNAL DE PHYSIQUE LETTRES", published in 1975; in Submicro Second Bistable Electrooptic Switching in Liquid Crystals in issue No. 36 (11) of "Applied Physics Letters", published in 1980, or in "Liquid Crystals" in issue No. 16 (141) of "Solid State Physics", published in 1981 may be used in the present invention Concretely, the ferroelectric liquid crystal may be either decyloxybenzylidene-p'-amino-2-methybutyl cinnamate (DOBAMBC), hexyloxybenzylidene-p'-amino-2-chloropropyl cinnamate (HOBACPC) or 4-o-(2-methyl)-butylresorcilidene-4'-octylaniline (MBRA8).

When any of these liquid crystal materials is used to form a liquid crystal device, the device may be supported by blocks that incorporate a heater so as to maintain the liquid crystal compound at a temperature that ensures that it stays in the chiral smectic state.

A method of forming a typical color filter will be described below with reference to FIG. 1 which shows processes for forming a color filter substrate.

First, a liquid resin such as a polyamino type liquid resin (an NMP solution) containing a coloring material having desired spectral characteristics at a P/V ratio ranging between ⅛ and 3/2 is coated on a substrate 1 to a predetermined thickness by a spinner to form a precolored resin film 7 of a first color, as shown in FIG. 1(a), and the precolored resin film 7 is prebaked at an appropriate temperature. Next, the precolored resin film 7 is exposed to light capable of sensitizing the photosensitive resin (that is, ultraviolet radiation from a high-pressure mercury lamp) through a photomask 8 having a predetermined pattern that corresponds to a pattern to be formed, as shown in FIG. 1 (b), so that the portion of the resin film that forms a pattern is hardened.

Subsequently, the substrate 1 on which the precolored resin film 7 containing hardened portions 7a formed in the manner shown in FIG. 1(c) has been formed is soaked in a solvent that is capable of dissolving only the non-exposed areas of the resin film (e.g., a solvent mainly composed of a N-methyl-2-pyrrolidone type solvent) and the pattern in the resin film 7 is thereby developed with the aid of ultrasonic waves. The substrate 1 is then rinsed (with, for example, 1,1,1-trichloroethane), and is post baked so as to obtain a patterned precolored resin film 9 such as that shown in FIG. 1 (d) in accordance with the present invention.

The steps illustrated in FIGS. 1 (a) to (d) are repeated a number of times corresponding to the number of required colors of a color filter using precolored liquid resins each containing a coloring material of a color different from those of the other coloring materials in a P/V ratio ranging between ⅛ and 3/2. FIG. 1 (e) shows an example of a color filter consisting of patterned precolored resin films 9, 9a and 9b having three different colors.

A protective layer 4 that is made of any of the above-described materials may be formed on the thus-formed color filter of the present invention, as shown in FIG. 1 (f).

In a color liquid crystal device according to the present invention, a plurality of intersections formed by causing upper and lower striped transparent electrodes to cross each other have a first group containing a blue coloring material, a second group containing a green coloring material and a third group containing a red coloring material, and the first, second and third groups are disposed in a striped or mosaic patterns.

[EXAMPLES]

Examples of the present invention will now be described in detail. Percentages indicated by the symbol % in the description are in weight terms.

EXAMPLE 1

Precolored blue resin materials that ensure desired spectral characteristics [i.e., photosensitive recolored resin materials composed of PA-1000C (product of Ube Industries, Ltd., which contains 10% of a polymer dispersed in a solvent of N-methyl-2-pyrrolidone) containing Heliogen Blue 1,7080 (product of BASF) in the various P/V ratios listed in the following Table 1] were each coated by means of a spinner to various thicknesses, also indicated in Table 1.

After each of the precolored resin layers was prebaked for 30 minutes at a temperature of 70° C., it was exposed to light from a high-pressure mercury lamp through a mask having a pattern corresponding to the pattern to be formed. After the exposure, the pattern images were each developed using ultrasonic waves and a special developing agent (mainly composed of N-methyl-2-pyrrolidone) that dissolved only the nonexposed areas of each of the precolored resin films. Thereafter, each substrate was rinsed using a special rinsing liquid (mainly composed of 1,1,1-trichloroehane) and was then post baked for 30 minutes at a temperature of 200° so as to form a patterned precolored blue resin film.

Next, a precolored green resin pattern was formed at a predetermined area of each of the glass substrates on which the precolored blue resin pattern had been formed in the same manner as in the formation of the precolored blue resin pattern with the exception that the precolored green resin materials [that is, photosensitive precolored resin materials composed of PA-1000C (product of Ube Industries, Ltd. that contains 10% of a polymer dispersed in a solvent of N-methyl-2-pyrrolidone) containing Lionol Green 6YK (product of Toyo Ink Mfg. Co., Ltd., C.I. No. 74265) at the various P/V ratios listed in Table 1] were employed.

Subsequently, a precolored red pattern was formed in a predetermined area of each of the glass substrates on which the blue and green patterns had been formed in the same manner as in the formation of those blue and green patterns with the exception that precolored red resin materials [that is, photosensitive precolored resin materials composed of PA-1000C (product of Ube Industries, Ltd. that contains 10% of a polymer dispersed in a solvent of N-methyl-2-pyrrolidone) containing Irgazin red BPT (product of Ciba-Geigy, C.I. No. 71127) at the various P/V ratios listed in Table 1] were employed, so as to form a striped, colored pattern of R (red), G (green) and B (blue).

A transparent resin material [PA-1000C (product of Ube Industries, Ltd. which contains 10% of a polymer dispersed in a solvent of N-methyl-2-pyrrolidone)] was then coated on each of the thus-formed color filter patterns by a means of spinner to a thickness of about 0.5 μm as a protective and flattening layer.

Subsequently, a film of ITO was formed to a thickness of 500 Å by sputtering over the entire protective and flattening layer, and was selectively removed in correspondence with the color filter pattern to provide a transparent electrode pattern. A polyimide forming solution (product of Hitachi Chemical Co., Ltd.; trademark: PIQ) was then coated over the entire surface by means of a spinner that was rotated at a speed of 3000 rpm, and was baked for 30 minutes at 150° C. so as to form a polyimide coating 2000 Å thick that served as an orientation film. After a rubbing treatment had been conducted on the surface of the polyimide coating, each of the thus-formed color filter substrates was pasted with another substrate to form a cell, and CS-1014 (a ferroelectric liquid crystal manufactured by Chisso Corporation) was charged into a sealed-in gap in the cell to provide a color liquid crystal device according to the present invention.

The thus-obtained color liquid crystal devices were observed using a polarization microscope of crossed nicols, so as to evaluate deflection in the orientation of the charged liquid crystal molecules. The Table 1 shows the results of the observation.

TABLE 1

| | P (Pigment)(RGB)/V (Resin) Weight proportion | | | | | |
|---|---|---|---|---|---|---|
| | 1/4 | 1/3 | 1/2 | 2/2 | 3/2 | 4/2 |
| Thickness of color filter (μm) | 2.5 | 2.0 | 1.5 | 1.0 | 0.80 | 0.75 |
| Evaluation of deflection in liquid crystal orientation | X | O | O | O | O | X |

(Note)
O indicates a state wherein no defects in orientation have occurred, and X represents a state wherein deflection in orientation have occurred.

EXAMPLE 2

Color liquid crystal devices of the present invention employing thin film transistors were formed in the manner described below.

Figure 2:
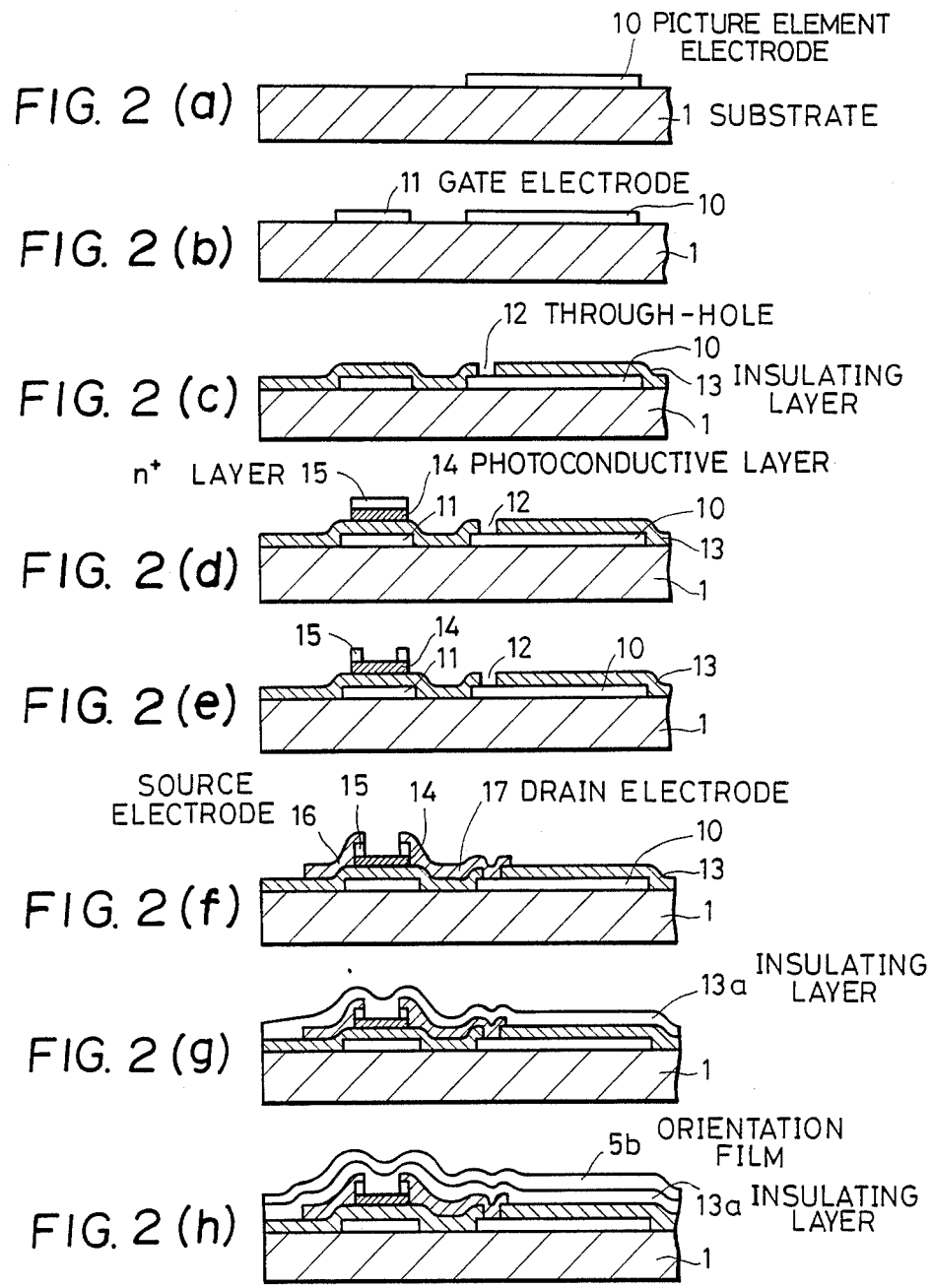
FIGS. 2(a) to (h) illustrate processes for forming a thin film transistor substrate of a color liquid-crystal device that employs at least one thin film transistor.

First, a thin film transistor substrate was formed in the manner shown in FIG. 2. More specifically, after a picture element electrode pattern 10 of I.T.O. was formed to a thickness of 1000 Å on a glass substrate 1 (product of Corning; trademark: 7059) by the photolithographic process, as shown in FIG. 2 (a), a layer of Al was deposited in a vacuum to a thickness of 1000 Å. The deposited layer was then selectively removed to form a gate electrode pattern 11 by the photolithographic process, as shown in FIG. 2 (b).

Subsequently, a photosensitive polyimide resin (product of Toray Industries, Inc.; trademark: Semicofine) was coated on the substrate 1 on which the electrode patterns had been formed to provide an insulating layer 13, and through-holes that constitute the contacts between drain electrode pattern 17 and the picture element electrode pattern 10 were formed in the insulating layer 13 by the photolithographic process, as shown in FIG. 2 (c).

Thereafter, the substrate 1 was set at a predetermined position within a deposition tank in which SiH$_4$ diluted with H$_2$ was introduced. After a photoconductive layer 14 (an intrinsic layer) of a-Si had been deposited in a vacuum to a thickness of 2000 Å on the entire surface of the substrate 1 on which the electrode patterns 10 and 11 and the insulating layer 13 had been formed by the glow discharge process, a n+ layer 15 was sequentially deposited on the photoconductive layer 14 in the same manner to a thickness of 1000 Å, as shown in FIG. 2 (d). Thereafter, the substrate 1 was taken out of the deposition tank, and the n+ layer 14 and the photoconductive layer 14 were selectively removed by the dry etching process in this order to form desired patterns such as those shown in FIG. 2 (e).

Subsequently, a layer of Al was formed by the vacuum deposition process to a thickness of 1000 Å on the substrate on which the photoconductive layer 14 and the n+ layer 15 had been formed. The formed layer of Al was then selectively removed by the photolithographic process to form a source electrode pattern 16 and a drain electrode pattern 17, as shown in FIG. 2 (f).

Thereafter, a negative resist (e.g., ODUR manufactured by Tokyo Oyo Kagaku) was applied over the entire surface of the substrate as a transparent insulating layer 13a, as shown in FIG. 2 (g), and a polyimide resin was coated to a thickness of 1200 Å. The polyimide resin layer was then heated for 1 hour at 250° C. to form an orientation layer 5b. Finally, a rubbing treatment was conducted on the surface the polyimide resin orientation layer to provide the layer with the function of orienting the liquid crystal.

An electrode substrate (shown in FIG. 2 (h)) was thus formed incorporating the polyimide resin layer that was capable of orienting the liquid crystal.

Subsequently, various color filters to be incorporated in opposing electrode substrates were formed in the same manner as in Example 1.

A layer of ITO was formed on each of the thus formed color filter patterns by the sputtering to a thickness of 500 Å to provide a transparent electrode layer, and a polyimide resin was coated to a thickness of 1200 Å and was heated for 1 hour at 250° C. to form a polyimide resin layer. The surface of the resin layer was then subjected to a rubbing treatment to provide it with a liquid crystal orientating function. Various color filter substrates were thus formed.

Each of the thus-formed color filter substrates was pasted with the previously formed substrate having at least one thin film transistor. A TN liquid crystal material was charged into a sealed-in gap between the substrates to provide a color liquid crystal device according to the present invention.

When the state of the orientation of the liquid crystal in each of the color liquid crystal devices was examined, the same results as those obtained in Example 1 were obtained.

Example 3

Color liquid crystal devices of the present invention were obtained in the same manner as in Example 2 with the exception that the color filter pattern having three colors was formed on the electrode layer in each opposing substrate.

When the state of the orientation of the liquid crystal in each of the devices was examined, the same results as those obtained in Example 1 were obtained.

EXAMPLE 4

Figure 3:
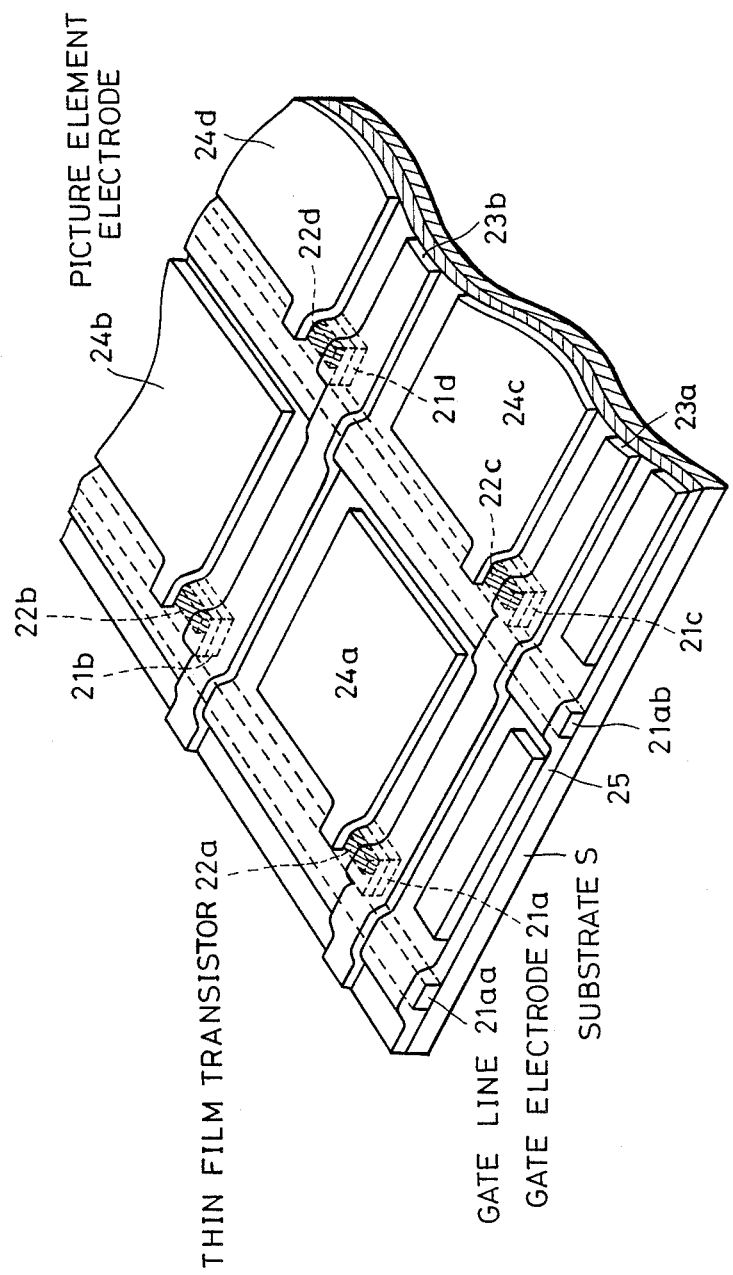
FIG. 3 is a perspective view of a thin film transistor substrate having a color filter, showing Example 4 of the present invention.
Figure 4:
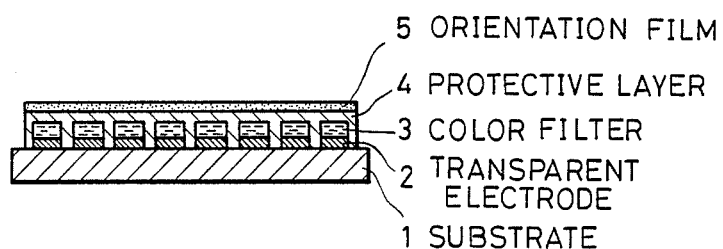
FIGS. 4 (a) and (b) are schematic and cross-sectional views of a color filter substrate used in a known color liquid-crystal device.
Figure 4:
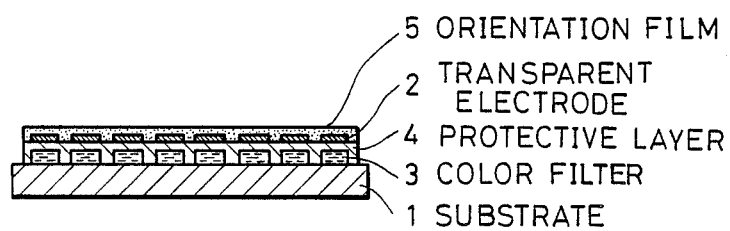

The color filter pattern having three colors was formed on each of the thin film transistor substrates such as those shown in FIG. 3 instead of each of the opposing electrode substrates. More specifically, thin film transistor substrates were each formed in the same manner as in Example 2 with the exception that the color filter pattern was formed in a mosaic pattern on the picture electrode pattern formed on the glass substrate. Each of the thus-formed substrates was pasted with an opposing electrode substrate, and a TN type liquid crystal material was charged into a gap between the substrates to provide a color liquid crystal device of the present invention.

When the state of the orientation of the liquid crystal in each of the devices was examined, the same results as those obtained in Example 1 were obtained.

As will be understood from the foregoing description, according to the present invention, it is possible to provide a thin color filter pattern whose surface and side shapes are accurate, which has less defects, and which is uniform and stable in terms of strength by restricting the ratio of the coloring material to the photosensitive resin containing the coloring material, i.e., the P/V ratio between $\frac{1}{8} \leq P/V \leq 3/2$. Therefore, it is possible to provide a color liquid crystal device which has no orientation deflection and which can provide a good quality display by the incorporation of such a good quality color filter pattern therein.

Further, it is possible to readily make a fine color filter pattern which has excellent characteristics and hence a highly reliable color liquid crystal device by the use of high-performance resin material and coloring material, according to the present invention.

What is claimed is:

1. A color liquid crystal device comprising a pair of substrates having electrodes, a color filter disposed between at least one of said pair of substrates and its electrode, and a liquid crystal disposed between said pair of substrates, wherein said color filter is composed of a resin and a coloring material, and V and P have a relationship of $\frac{1}{8} \leq P/V \leq 3/2$, where V (gr) and P (gr) represent the respective contents of said resin and said coloring material that form said color filter.

2. A color liquid crystal device according to claim 1, wherein said resin is an aromatic series polyamide resin or an aromatic series polyimide resin which has a photosensitive group in its molecule before it is hardened.

3. A color liquid crystal device according to claim 1, wherein said coloring material is a pigment.

4. A color liquid crystal device according to claim 3, wherein said pigment is a one composed of at least one compound selected from a group consisting of azo-pigments, condensed azo pigments, phthalocyanine pigments, indigo pigment, anthraquinone pigment, perylene pigment, perinon pigment, dioxazine pigment, quinacridone pigments, isoindolenone pigment, phthalon pigment and methine azomethine pigment.

5. A color liquid crystal device according to claim 3, wherein said pigment is a phthalocyanine pigment.

6. A color liquid crystal device according to claim 3, wherein said pigment is perylene pigment.

7. A color liquid crystal device according to claim 1, wherein said electrodes formed on said pair of substrates form intersections at a plurality of locations, and said intersections have first, second and third groups which have blue, green and red coloring materials, respectively.

8. A color liquid crystal device according to claim 7, wherein said first group having said blue coloring material, said second group having said green coloring material and said third group having said red coloring material are disposed in a striped pattern.

9. A color liquid crystal device according to claim 7, wherein said first group having said blue coloring material, said second group having said green coloring material and said third group having said red coloring material are disposed in a mosaic pattern.

10. A color liquid crystal device according to claim 1, including a protecting film disposed between said color filter and the electrode.

11. A color liquid crystal device according to claim 1, including an orientation film formed adjacent to said liquid crystal.

12. A color liquid crystal device according to claim 11, wherein said orientation film is composed of at least one resin selected from a group consisting of polyvinyl alcohols, polyimides, polyamide-imides, polyesters, polycarbonates, polyvinyl acetals, a polyvinyl chloride, a polyvinyl acetate, polyamides, polystyrenes, cellulosic resins, melamine resins, urea resins, acrylic resins, photosensitive polyimides, photosensitive polyamides and photoresists.

13. A color liquid crystal device according to claim 11, wherein said orientation film is composed of a polyvinyl alcohol.

14. A color liquid crystal device according to claim 11, wherein said orientation film is composed of a polyimide.

15. A color liquid crystal device according to claim 1, wherein said liquid crystal is a ferroelectric liquid crystal.

16. A color liquid crystal device according to claim 15, wherein said ferroelectric liquid crystal is a chiral smectic liquid crystal.

17. A color liquid crystal device according to claim 1, wherein at least one of said pair of substrates has at least one thin film transistor.

18. A color liquid crystal device comprising a pair of substrates having electrodes, a color filter disposed on the electrodes formed on at least one of said pair of substrates, and a liquid crystal disposed between said pair of substrates, wherein said color filter is composed of a resin and a coloring material, and V and P have a relationship of $\frac{1}{8} \leq P/V \leq 3/2$, where V (gr) and P (gr) are the respective contents of said resin and said coloring material that form said color filter.

19. A color liquid crystal device according to claim 18, wherein said resin is an aromatic series polyamide resin or an aromatic series polyimide resin which has a photosensitive group in its molecule before it is hardened.

20. A color liquid crystal device according to claim 18, wherein said coloring material is a pigment.

21. A color liquid crystal device according to claim 20, wherein said pigment is a one composed of at least one compound selected from a group consisting of azo-pigments, condensed azo pigments, phthalocyanine pigments, indigo pigment, anthraquinone pigment, perylene pigment, perinon pigment, dioxazine pigment, quinacridone pigments, isoindolenone pigment, phthalon pigment and methine azomethine pigment.

22. A color liquid crystal device according to claim 21, wherein said pigment is a phthalocyanine pigment.

23. A color liquid crystal device according to claim 21, wherein said pigment is perylene pigment.

24. A color liquid crystal device according to claim 18, wherein said electrodes formed on said pair of substrates form intersections at a plurality of locations, and said intersections have first, second and third groups which have blue, green and red coloring materials, respectively.

25. A color liquid crystal device according to claim 24, wherein said first group having said blue coloring material, said second group having said green coloring material and said third group having said red coloring material are disposed in a striped pattern.

26. A color liquid crystal device according to claim 24, wherein said first group having said blue coloring material, said second group having said green coloring material and said third group having said red coloring material are disposed in a mosaic pattern.

27. A color liquid crystal device according to claim 18, including a protecting film disposed between said color filter and the electrode.

28. A color liquid crystal device according to claim 18, including an orientation film formed adjacent to said liquid crystal.

29. A color liquid crystal device according to claim 28, wherein said orientation film is composed of at least one resin selected from a group consisting of polyvinyl alcohols, polyimides, polyamide-imides, polyesters, polycarbonates, polyvinyl acetals, a polyvinyl chloride, a polyvinyl acetate, polyamides, polystyrenes, cellulosic resins, melamine resins, urea resins, acrylic resins, photosensitive polyimides, photosensitive polyamides and photoresists.

30. A color liquid crystal device according to claim 28, wherein said orientation film is composed of a polyvinyl alcohol.

31. A color liquid crystal device according to claim 28, wherein said orientation film is composed of a polyimide.

32. A color liquid crystal device according to claim 18, wherein said liquid crystal is a ferroelectric liquid crystal.

33. A color liquid crystal device according to claim 32 wherein said ferroelectric liquid crystal is a chiral smectic liquid crystal.

34. A color liquid crystal device according to claim 18, wherein at least one of said pair of substrates has at least one thin film transistor.

* * * * *